United States Patent
Campbell et al.

(10) Patent No.: US 9,768,719 B2
(45) Date of Patent: Sep. 19, 2017

(54) METHODS AND APPARATUS FOR GENERATING CURRENT COMMANDS FOR AN INTERIOR PERMANENT MAGNET (IPM) MOTOR

(71) Applicant: Faraday&Future Inc., Gardena, CA (US)

(72) Inventors: Mengwei Li Campbell, Torrance, CA (US); Steven E. Schulz, Torrance, CA (US)

(73) Assignee: FARADAY&FUTURE INC., Gardena, CA (US)

( * ) Notice: Subject to any disclaimer, the term of this patent is extended or adjusted under 35 U.S.C. 154(b) by 0 days.

(21) Appl. No.: 14/859,182

(22) Filed: Sep. 18, 2015

(65) Prior Publication Data

US 2017/0085200 A1 Mar. 23, 2017

(51) Int. Cl.
*H02P 21/00* (2016.01)
*H02P 27/06* (2006.01)
*H02P 21/06* (2016.01)
*H02P 21/12* (2016.01)

(52) U.S. Cl.
CPC ...... *H02P 21/0035* (2013.01); *H02P 21/0089* (2013.01); *H02P 21/06* (2013.01); *H02P 21/12* (2013.01); *H02P 27/06* (2013.01)

(58) Field of Classification Search
CPC ...... H02P 21/0035; H02P 27/00; H02P 27/06; H02P 21/06; H02P 21/0089; H02P 21/12
USPC .............. 318/400.02, 722, 400.11
See application file for complete search history.

(56) References Cited

U.S. PATENT DOCUMENTS

| | | | | |
|---|---|---|---|---|
| 5,345,155 A | * | 9/1994 | Masaki | B60L 11/1803 318/400.07 |
| 5,739,664 A | * | 4/1998 | Deng | B60L 15/025 318/599 |
| 6,855,016 B1 | * | 2/2005 | Jansen | B63H 16/14 440/27 |
| 6,876,169 B2 | * | 4/2005 | Gallegos-Lopez | H02P 21/22 318/609 |
| 6,986,688 B1 | * | 1/2006 | Jansen | B63H 20/007 440/1 |
| 7,005,819 B2 | * | 2/2006 | Takai | B60L 11/123 180/65.1 |

(Continued)

OTHER PUBLICATIONS

International Search Report of Application PCT/US2015/066399 dated Jun. 20, 2016.

*Primary Examiner* — Rita Leykin
(74) *Attorney, Agent, or Firm* — Knobbe, Martens, Olson & Bear LLP

(57) ABSTRACT

In one aspect, an apparatus includes a motor and inverter configured to provide input power to the motor and a data store comprising at least one entry including a first torque command, a first motor speed, and a first DC voltage value. The first torque command and the first motor speed and the first DC voltage value are associated with a first current output. The apparatus includes a processor configured to receive a torque input, a DC voltage input, and a motor speed input and determine an output current associated with the torque input, the DC voltage input, and the motor speed input, correct the output current to be within a voltage constraint of the motor when the DC voltage input is than a reference voltage at the motor and output the corrected output current to cause the inverter to provide the input power to the motor.

24 Claims, 9 Drawing Sheets

(56) References Cited

U.S. PATENT DOCUMENTS

| | | | |
|---|---|---|---|
| 7,023,168 B1* | 4/2006 | Patel | H02P 21/10 318/700 |
| 7,304,444 B2* | 12/2007 | Takano | B60L 11/1851 180/65.1 |
| 7,852,040 B2* | 12/2010 | Lee | H02P 21/0089 318/432 |
| 7,960,928 B2* | 6/2011 | Tang | B60L 15/025 318/400.02 |
| 8,063,596 B2* | 11/2011 | Imura | B60L 15/025 318/400.01 |
| 8,115,437 B2 | 2/2012 | Royak | |
| 8,134,321 B2* | 3/2012 | Schulz | H02P 21/22 318/432 |
| 8,183,814 B2* | 5/2012 | Fuchs | H02P 1/38 318/524 |
| 8,228,016 B2* | 7/2012 | Gallegos-Lopez | B60L 15/025 318/609 |
| 8,278,855 B2* | 10/2012 | Kitanaka | H02P 27/08 318/400.22 |
| 8,314,579 B2 | 11/2012 | Nishimura | |
| 8,410,737 B2* | 4/2013 | Wu | H02P 21/0025 180/65.265 |
| 8,519,648 B2* | 8/2013 | Gallegos-Lopez | H02P 21/0089 318/400.01 |
| 8,604,735 B2 | 12/2013 | Filka | |
| 8,648,562 B2* | 2/2014 | Lipo | H02P 21/0089 318/400.01 |
| 8,674,637 B2* | 3/2014 | Kamijo | B60L 3/003 180/65.1 |
| 8,742,705 B2* | 6/2014 | Yoo | H02P 21/06 310/156.03 |
| 8,779,702 B2 | 7/2014 | Si | |
| 9,000,694 B2* | 4/2015 | Uematsu | H02P 21/0096 318/400.01 |
| 9,106,174 B2* | 8/2015 | Sekiya | H02P 3/18 |
| 9,136,789 B2* | 9/2015 | Uematsu | H02P 21/0096 |
| 9,166,515 B2* | 10/2015 | Kaita | B60L 11/1853 |
| 9,236,736 B2* | 1/2016 | Oyobe | B60L 7/14 |
| 9,270,223 B2* | 2/2016 | Wu | H02P 27/08 |
| 9,276,736 B2* | 3/2016 | Peirce | H04L 9/0819 |
| 9,312,799 B2* | 4/2016 | Kato | H02P 21/0089 |
| 9,361,260 B2* | 6/2016 | Sasaki | G06F 13/4068 |
| 9,372,234 B2* | 6/2016 | Wang | G01R 31/3191 |
| 9,442,029 B2* | 9/2016 | Wu | G01L 3/26 |
| 2005/0035676 A1* | 2/2005 | Rahman | B60K 6/26 310/83 |
| 2009/0027000 A1* | 1/2009 | Gallegos-Lopez | B60L 15/025 318/722 |
| 2010/0253252 A1 | 10/2010 | Schulz et al. | |
| 2011/0231066 A1* | 9/2011 | Ohno | B62D 5/046 701/42 |
| 2012/0217916 A1* | 8/2012 | Wu | H02P 21/0025 318/400.11 |
| 2013/0009574 A1* | 1/2013 | Yoo | H02P 21/06 318/400.02 |
| 2013/0009575 A1* | 1/2013 | Yoo | H02P 21/14 318/400.02 |
| 2013/0020971 A1* | 1/2013 | Gallegos-Lopez et al. | H02P 21/14 318/400.02 |
| 2014/0070735 A1* | 3/2014 | Luedtke | H02P 27/085 318/139 |
| 2014/0070738 A1* | 3/2014 | Luedtke | H02P 23/009 318/400.02 |
| 2014/0203754 A1* | 7/2014 | Bhangu | H02P 23/009 318/702 |
| 2015/0349679 A1 | 12/2015 | Rogers | |
| 2015/0381081 A1* | 12/2015 | Bhangu | H02P 21/0089 318/400.05 |

* cited by examiner

METHODS AND APPARATUS FOR GENERATING CURRENT COMMANDS FOR AN INTERIOR PERMANENT MAGNET (IPM) MOTOR

BACKGROUND

Field of the Invention

This disclosure relates to methods, systems, and apparatus of driving a motor, and more particularly, to methods for accurately generating current output commands when operating in a field-weakening region of the motor based on a reduced number of look-up tables.

Description of the Related Art

Electric motor control systems often involve the generation and storage of a plurality of data points for given input signals and corresponding output commands or values to select based on the input signals. In some embodiments, the data points may be stored in a data store, which may be conceptually formed as one or more lookup tables each corresponding to a particular DC input voltage (such as from a battery) to an inverter that generates 3-phase AC voltage inputs to the motor. In some implementations, a lookup table may exist for given increments of DC inverter input voltage through the voltage range of the DC inverter input that may be encountered during use of the motor. Each lookup table may be populated with a two-dimensional array of output current commands that control the inverter. Along one axis of each lookup table is a torque command value (e.g. a desired torque designated by the user of the motor), while along the other axis of each lookup table is a motor speed input (e.g. the rotation rate of the motor that exists at the time the torque command is received). Accordingly, the output current commands may correspond to a necessary command current in order to produce the torque command given a particular existing motor speed input and DC inverter input voltage.

The output current commands populating each lookup table may correspond to the particular values of voltage input, motor speed input, and torque command input. For example, at 50V, a motor speed input of 5000 RPM and a torque command input of 100 Nm may produce currents P1, whereas if the inverter input is 100V, the same motor speed and torque command inputs may produce currents P2, where currents P1 and P2 are different. The more lookup tables that exist (e.g., the more voltages that have associated lookup tables), the more accurate or granular the output current commands can be. If the DC inverter input voltage is a voltage that is between two voltages for which lookup tables are available, a linear interpolation process may be used to produce a current command output that is appropriately also between two lookup table entries in the higher and lower DC input voltage tables adjacent to the actual DC inverter input voltage.

However, this linear interpolation process may not be possible to accurately perform given the lookup tables in memory at high motor speeds and/or high torque command input. Additionally, creating these lookup tables takes substantial time and effort as they are based on experimental measurements made during motor testing.

SUMMARY OF THE INVENTION

The systems, methods, and apparatus of this disclosure each have several innovative aspects, no single one of which is solely responsible for the desirable attributes disclosed herein.

One innovative aspect of the subject matter described in this disclosure can be implemented in an apparatus. The apparatus comprises a motor and an inverter configured to provide input power to the motor. The apparatus further comprises a DC power bus configured to provide input power to the inverter, a data store comprising information defining inverter currents for producing different motor torque outputs at different motor speeds and different DC power bus voltages, and a processor. The processor is configured to receive a torque command, a DC power bus voltage measurement, and a motor speed measurement and determine, using the data store, an inverter current command based at least in part on the torque command, the DC power bus voltage measurement, and the motor speed measurement. The processor is further configured to modify the inverter current command in accordance with a voltage constraint of the motor and control the inverter based at least in part on the determined inverter current command.

Another innovative aspect of the subject matter described in this disclosure can also be implemented in a method. The method comprises receiving a torque command, a DC power bus voltage measurement, and a motor speed measurement. The method further comprises determining, using a data store, an inverter current command based at least in part on the torque command, the DC power bus voltage measurement, and the motor speed measurement, wherein the data store comprises information defining inverter currents for producing different motor torque outputs at different motor speeds and different DC power bus voltages. The method also comprises modifying the inverter current command in accordance with a voltage constraint of the motor and controlling an inverter based at least in part on the determined inverter current command.

Another innovative aspect of the subject matter described in this disclosure can also be implemented in another apparatus. The apparatus comprises means for driving and means for providing input power to the driving means. The apparatus further comprises means for receiving a torque command, a DC power bus voltage measurement, and a motor speed measurement. The apparatus also comprises means for determining an inverter current command, based at least in part on the torque command, the DC power bus voltage measurement, and the motor speed measurement, from information defining inverter currents for producing different motor torque outputs at different motor speeds and different DC power bus voltages. The apparatus also further comprises means for modifying the inverter current command in accordance with a voltage constraint of the motor and means for controlling an inverter based at least in part on the determined inverter current command.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations, however, are merely examples and are not intended to be limiting. Throughout the drawings, similar symbols typically identify similar components, unless context dictates otherwise. Note that the relative dimensions of the following figures may not be drawn to scale.

FIG. 2b shows a first lookup table ($V_{low}$) of output current command values roughly corresponding to the $V_{low}$ motor torque curve of FIG. 2a.

FIG. 2c shows a second lookup table ($V_{high}$) of output current command values roughly corresponding to the $V_{high}$ motor torque curve of FIG. 2a.

DETAILED DESCRIPTION

Figure 1:
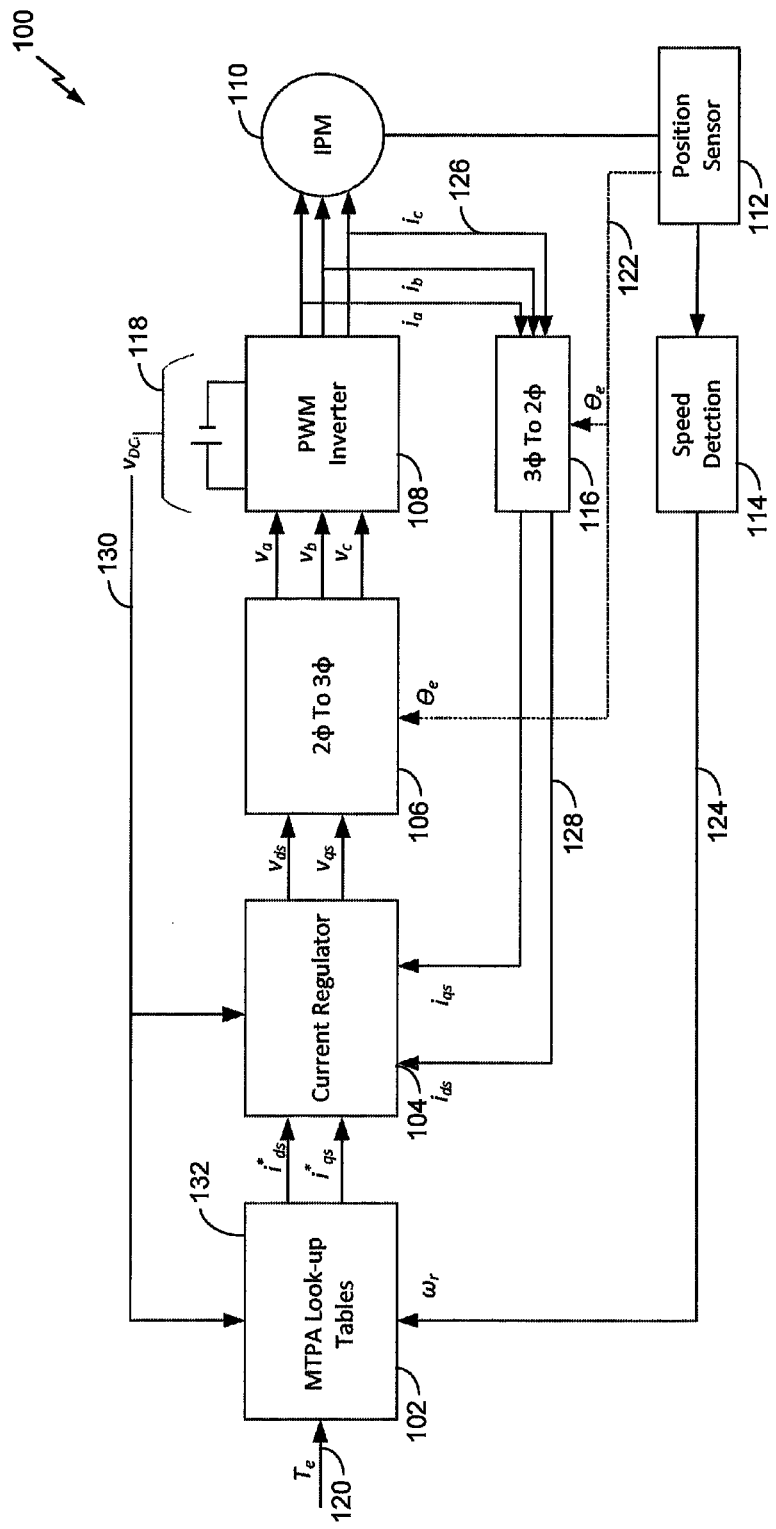
FIG. 1 shows a block diagram of an exemplary motor drive control system, such as that used in an internal permanent magnet (IPM) motor drive system.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that can be configured to drive an IPM, or similar, motor, whether in motion or stationary. More particularly, it is contemplated that the described implementations may be included in or associated with a variety of IPM or similar motor applications such as, but not limited to: electric pumps, electric vehicles, appliances, and a variety of electric motor driven devices. Thus, the teachings are not intended to be limited to the implementations depicted solely in the Figures, but instead have wide applicability as will be readily apparent to one having ordinary skill in the art.

Various industries and applications commonly use closed loop current control to regulate motor torque in high performance motor drives. Closed loop current control systems may respond to constantly changing conditions in the system operating environment. For example, when driving electric motors, the closed loop current control systems may provide for continual monitoring and control over operation of the electric motor via feedback and various conditions monitoring. The closed loop current control systems may automatically adjust inputs and aspects of the system to maintain desired states.

A plurality of lookup tables in memory may store current commands based on maximum torque per amp (MTPA) for the IPM motor drive system. In some embodiments, the memory may comprise a data store, within which the various data entries may be formatted or structured in the lookup tables. Initial testing processes may generate the lookup tables. The inputs to the lookup tables may be torque command, measured DC voltage, and measured motor speed. The output of the lookup table may be the current commands used to drive the IPM motor drive system (for example, ($i_d$,$i_q$) current values). The current commands may correspond to the voltages that are input to an inverter for driving the motor. Each lookup table may correspond to a different voltage, where the voltage corresponds to a DC voltage bus measurement at the inverter that drives the motor. The initial testing processes may generate the lookup tables by operating the IPM motor drive system at each of the torque command inputs and motor speed inputs of the lookup table for each voltage, varying the voltage within a range of available voltages for the IPM motor drive system to generate the plurality of lookup tables for each varied voltage within the range of available voltages.

In operation of the IPM motor drive system, when the torque command is received (for example, based on a desired acceleration, etc.), along with the measured DC voltage and the motor speed, the appropriate lookup table is selected from the plurality of lookup tables based on the measured DC voltage (e.g., when the measured DC voltage is 100V, the 100V lookup table is selected). The system then uses the torque command and the measured motor speed within the selected lookup table to identify (e.g., lookup) the current commands to be output to the IPM motor drive system. Examples of two lookup tables are shown in Tables 1 and 2 below. When the measured DC voltage is 100V, the torque command is 75, and the motor speed is 125, the Table 1 lookup table will be selected and will output ($i_{d5}$,$i_{q5}$). If the measured DC voltage is 150V, the torque command is 100, and the motor speed is 130, the Table 2 lookup table will be selected and will output ($i_{d19}$,$i_{q19}$). The current command has two components, an $i_d$ component and an $i_q$ component.

TABLE 1

Lookup Table for V = 100 V

| T/ω | 100 | 125 | 130 |
|---|---|---|---|
| 50 | $i_{d1}$, $i_{q1}$ | $i_{d2}$, $i_{q2}$ | $i_{d3}$, $i_{q3}$ |
| 75 | $i_{d4}$, $i_{q4}$ | $i_{d5}$, $i_{q5}$ | $i_{d6}$, $i_{q6}$ |
| 100 | $i_{d7}$, $i_{q7}$ | $i_{d8}$, $i_{q8}$ | $i_{d9}$, $i_{q9}$ |

TABLE 2

Lookup Table for V = 150 V

| T/ω | 100 | 125 | 130 |
|---|---|---|---|
| 50 | $i_{d11}$, $i_{q11}$ | $i_{d12}$, $i_{q12}$ | $i_{d13}$, $i_{q13}$ |
| 75 | $i_{d14}$, $i_{q14}$ | $i_{d15}$, $i_{q15}$ | $i_{d16}$, $i_{q16}$ |
| 100 | $i_{d17}$, $i_{q17}$ | $i_{d18}$, $i_{q18}$ | $i_{d19}$, $i_{q19}$ |

FIG. 1 shows a block diagram of an exemplary motor drive control system, such as that used in an internal permanent magnet (IPM) motor drive system. The IPM motor drive system 100 may include various components or representative components, such as MTPA lookup tables (lookup tables) 102, current regulator 104, 2-to-3-phase converter 106, pulse width modulated (PWM) inverter 108, IPM motor 110, position sensor 112, speed detector 114, 3-to-2-phase converter 116, voltage meter 118, torque command input 120, position feedback 122, motor speed feedback 124, 3-phase current feedback 126, 2-phase current feedback 128 calculated from the 3-phase measured current values, DC voltage measurement 130, and output current commands 132. In some embodiments, the DC voltage measurement 130 corresponds to the DC voltage bus measurement at the inverter 108. The output current commands 132 are shown in FIG. 1 having two values ($i^*_{ds}$, $i^*_{qs}$); however, for simplicity, the two values of the output current commands 132 will be referred to herein as a single output current command 132. The lookup tables 102 may correspond to the lookup tables described above in relation to Tables 1 and 2 and may have the torque command input 120, the motor speed feedback 124, and the DC voltage measurement 130 as inputs. Accordingly, the appropriate lookup table 102 may be selected from the plurality of lookup tables 102 based on the DC voltage measurement 130, and the appropriate lookup table 102 may be used to identify the output current command 132 based on the torque command input 120 and the motor speed feedback 124. The output current command 132 may feed to the current regulator 104, which may feed a corresponding voltage to the 2-to-3-phase converter 106 based on the DC voltage measurement 130 and the 2-phase current feedback 128.

The 2-to-3-phase converter 106 can convert the 2-phase voltage signal output by the current regulator 104 to a three-phase voltage signal to be fed to the PWM inverter 108, which can output a generated three-phase AC voltage to the IPM motor 110. In some embodiments, the PWM inverter 108 may be connected to a DC voltage bus, which may provide input power to the PWM inverter 108. The position sensor 112 can generate the position feedback 122, which the speed detector 114 can use to generate the motor speed feedback 124. The 3-to-2-phase converter can use the position feedback 122 when converting the three-phase current feedback 126 to the two-phase current feedback 128, and the 2-to-3 phase converter can use the position feedback 122 when converting the two-phase output voltage from the current regulator 104 to the three-phase voltage input to the PWM inverter 108. The voltage meter 118 can generate the DC voltage measurement 130 at the PWM inverter 108. The PWM inverter 108 can convert the three-phase DC voltage received from the 2-to-3 phase converter to a three-phase AC voltage that powers the IPM motor 110. The lookup tables 102 and the current regulator 104 can both use the DC voltage measurement in identifying the output current command 132 and the conversion of the output current command to output voltages, respectively. Detailed operation of the functional blocks of the IPM motor drive system 100 is known in the art, and need not be described in detail.

As described above, a processor (not shown in FIG. 1) may use the lookup tables 102 to identify the output current command 132 given the torque command input 120, the DC voltage measurement 130, and the motor speed feedback 124. The processor may select the lookup table 102 that corresponds to the DC voltage measurement 130 when the DC voltage measurement is received with the command torque input 120 and the motor speed feedback 124. However, there may be instances when there is no lookup table 102 corresponding exactly to the DC voltage measurement 130. For example, the DC voltage measurement 130 may be 353V and there may only be lookup tables 102 for 350V and 355V. Accordingly, the processor may calculate by interpolation the output current command 132 for the DC voltage measurement 130 based on corresponding values in the existing 350V and 355V lookup tables 102.

When interpolating the output current command 132 based on lookup tables 102 corresponding to voltages that bound the DC voltage measurement 130 ($V_{meas}$), the processor can first select the necessary lookup tables. The processor may select a first lookup table from the plurality of lookup tables 102 that bounds the $V_{meas}$ on the low side (e.g., the lookup table for a first voltage lower than the $V_{meas}$ having a lookup table) and a second lookup table that bounds the $V_{meas}$ on the high side (e.g., the lookup table for a first voltage higher than the $V_{meas}$ having a lookup table). Accordingly, for the example described above, the processor may select the first lookup table for $V_{low}$, where $V_{low}$=350V, and the second lookup table for $V_{high}$, where $V_{high}$=355V. Accordingly, $V_{low}<V_{meas}<V_{high}$. The interpolation may proceed by the processor first identifying $Id_{low}$ in the first lookup table ($V_{low}$) based on the torque command input 120 ($T_{cmd}$) and the motor speed feedback 124 ($\omega_r$), and then identifying $Id_{high}$ in the second lookup table ($V_{high}$) based on the torque command input 120 $T_{cmd}$ and motor speed feedback 124 $\omega_r$. The processor then uses Equation 1 below to interpolate the output current command 132 $Id_{meas}$ corresponding to the DC voltage measurement 130 ($V_{meas}$):

$$Id_{meas}=Id_{low}+(Id_{high}-Id_{low})*(V_{meas}-V_{low})/(V_{high}-V_{low}) \quad \text{(Equation 1)}$$

The linear interpolation described above is applicable for any situations where the torque command input 120 ($T_{cmd}$) exists in both lower and higher ($V_{low}$ and $V_{high}$, respectively) lookup tables in relation to the DV voltage measurement 130. For example, the linear interpolation described would provide accurate current outputs for DC voltage measurements 130 within a constant torque region of the IPM motor. However, in some situations, the output current command 132 for a given torque command input 120 may only exist in a single lookup table (e.g., the second lookup table for $V_{high}$) because the torque command input 120 may be greater than the maximum torque for the $V_{low}$ lookup table at the motor speed feedback 124. Accordingly, interpolation becomes less feasible and more error prone because only one lookup table can be used to source the necessary values for Equation 1.

Figure 2A:
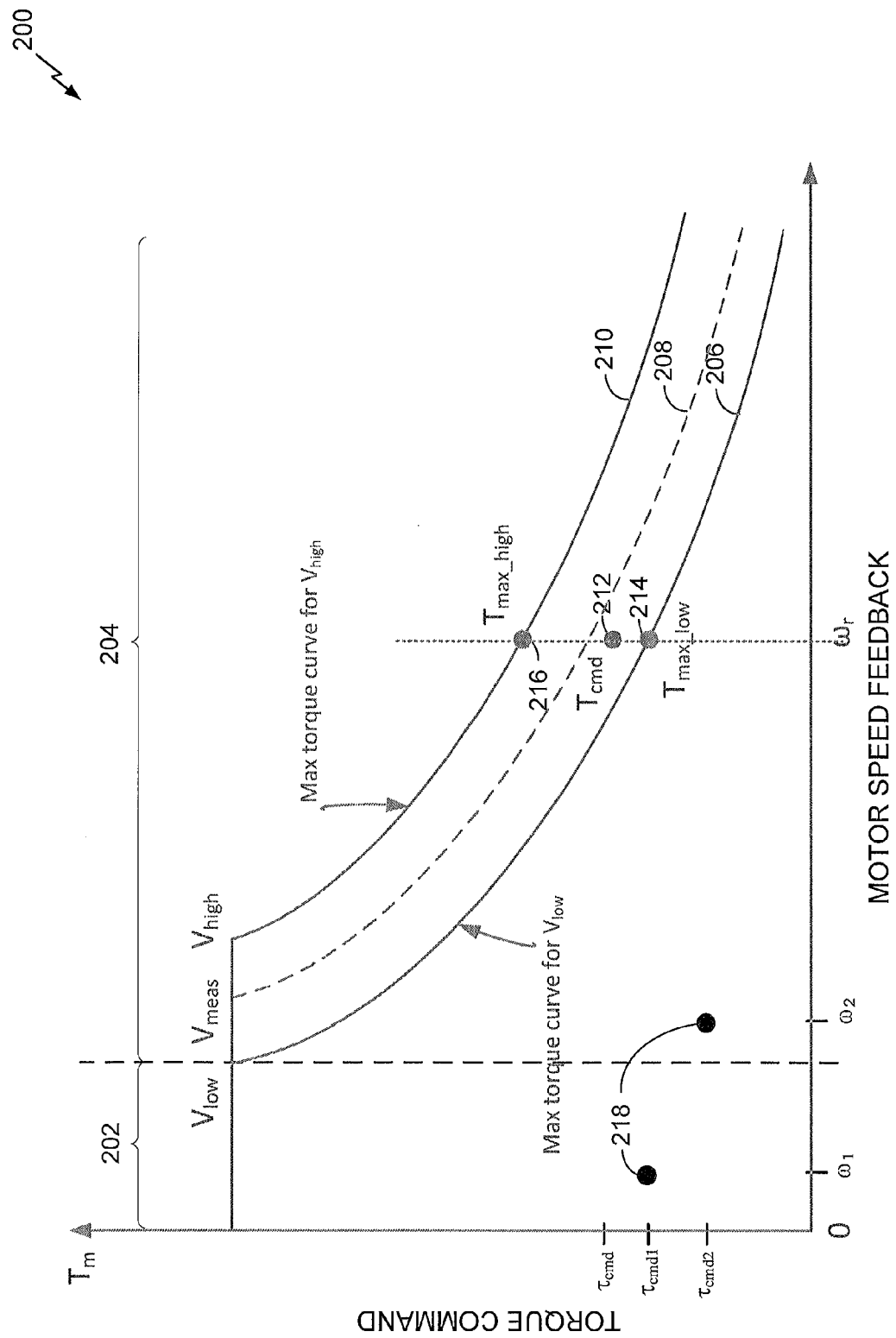
FIG. 2a shows a graph including motor torque curves for the IPM motor drive system at a plurality of voltages including both the constant torque and field weakening regions.

FIG. 2a shows a graph including motor torque curves for the IPM motor drive system at a plurality of voltages including both the constant torque and field weakening regions. The graph 200 depicts motor torque curves for the IPM motor 110 (FIG. 1) at the DC voltages $V_{low}$ ($T_{max\_low}$ 206), $V_{meas}$ ($T_{max\_meas}$ 208), and $V_{high}$ ($T_{max\_high}$ 210). The x-axis of the graph 200 depicts the motor speed ($\omega_r$) of the IPM motor 110, corresponding to the motor speed feedback 124 of FIG. 1, while the y-axis of the graph 200 depicts the torque command ($T_m$) 120 of the IPM motor 110, corresponding to the torque command 120 of FIG. 1. The graph 200 also shows a constant torque region 202, where the $V_{low}$, $V_{meas}$ and $V_{high}$ voltages are capable of generating the same maximum torque command values at the same motor speeds. The graph 200 also shows a field weakening region 204, where the $V_{low}$, $V_{meas}$, and $V_{high}$ voltages may generate different maximum torque command values at the same motor speeds.

Figure 2B:
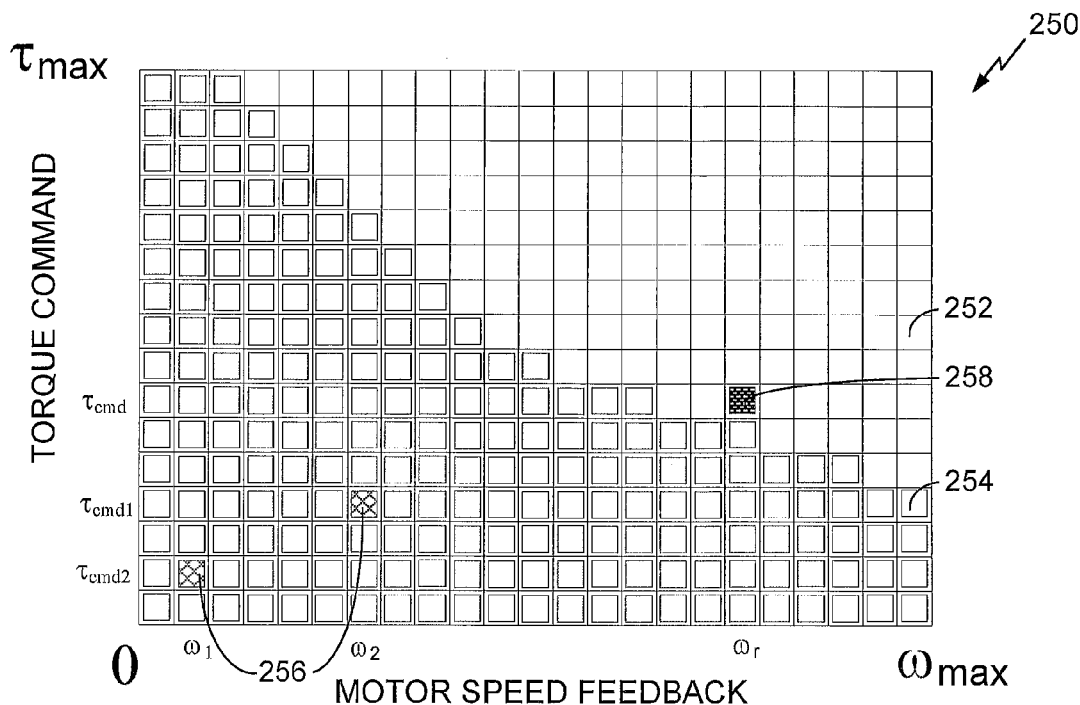

FIG. 2b shows a first lookup table ($V_{low}$) of output current command values roughly corresponding to the $V_{low}$ motor torque curve of FIG. 2a. The lookup table 250 shows a two dimensional array of output current commands (corresponding to the output current commands 132 of FIG. 1) having along one axis torque command ($T_m$) values and along the other axis motor speed ($\omega_r$) inputs. The torque command axis ranges from 0 to $\tau_{max}$ while the motor speed axis ranges from 0 to $\omega_{max}$. Empty locations 252 correspond to torque command and motor speed combinations for which the corresponding voltage $V_{low}$ cannot generate the necessary output current command (e.g., the torque command 120 cannot be generated at the voltage $V_{low}$ and the motor speed feedback 124). Filled locations 254 correspond to torque command and motor speed feedback combinations at which the corresponding $V_{low}$ can generate the necessary output current command (e.g., the torque command 120 can be generated at the voltage $V_{low}$ and the motor speed feedback 124). As shown, the lookup table 250 depicts a more granular motor torque curve than the graph 200 of FIG. 2a for the $V_{low}$ DC voltage.

Figure 2C:
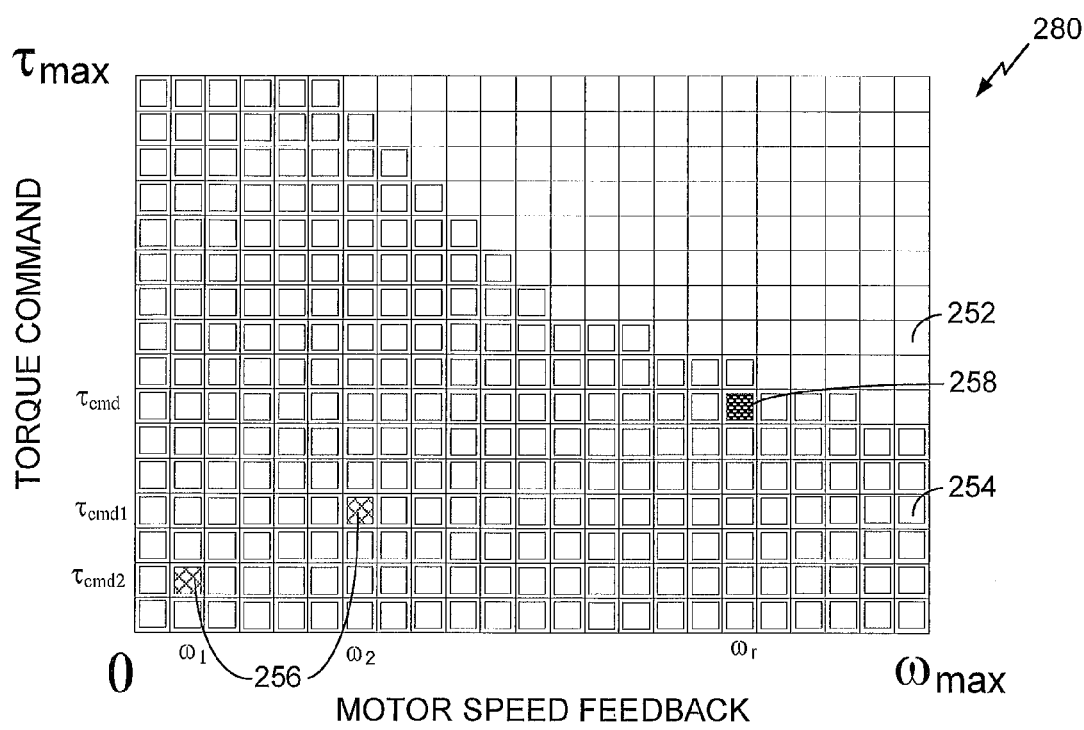

FIG. 2c shows a second lookup table ($V_{high}$) of output current command values roughly corresponding to the $V_{high}$ motor torque curve of FIG. 2a. The features of lookup table 280 are similar to those described in relation to the lookup table 250 of FIG. 2b and will not be described again. As shown, the lookup table 280 depicts a more granular motor torque curve than the graph 200 of FIG. 2a for the $V_{high}$ DC voltage, where the current command values of the $V_{low}$ lookup table 250 of FIG. 2b are each covered by the $V_{high}$ lookup table 280.

When the torque command input 120 is less than the $T_{low\_max}$ at the measured voltage (correspondingly less than the $T_{high\_max}$), the interpolation methods described above in relation to Equation 1 may function when a lookup table does not exist for $V_{meas}$, so long as both the lookup tables 250 and 280 for the Vlow and Vhigh, respectively, include a value 254 for the combination of torque command input 120 and motor speed $\omega_r$. For example, at the points 218 (FIG. 2a) corresponding to $T_{cmd1}$ and $T_{cmd2}$ and $\omega_1$ and $\omega_2$, respectively, the torque command inputs 120 exists in both the $V_{low}$ and the $V_{high}$ lookup tables, and thus the processor may use the $V_{low}$ and $V_{high}$ lookup tables to interpolate the output current command 132 for $V_{meas}$, where $V_{low} < V_{meas} < V_{high}$. The points 218 in FIG. 2a correspond to the locations 256 in FIGS. 2b and 2c. Since the locations 256 are filled in both the lookup tables 250 and 280, the processor may use interpolation to determine the output command current at for the torque command $T_{cmd}$, DC voltage measurement $V_{meas}$, and motor speed $\omega_r$ (because the output current command exists at these locations for both the lookup tables 250 and 280).

However, in the field weakening region 204, for example for a point 212 (FIG. 2a) at a commanded torque value $T_{cmd}$, the torque command does not exist in the $V_{low}$ lookup table for the speed $\omega_r$. Similarly, the location 258 in FIG. 2b is empty in the lookup table 250 (corresponding to $V_{low}$) and filled in the lookup table 280 of FIG. 2c (corresponding to $V_{high}$). Accordingly, since the point 212 (location 258 of FIGS. 2b and 2c) is outside the motor torque curve of the $V_{low}$ (e.g., $T_{cmd}$ exceeds the maximum torque ($T_{max\_low}$ 214) at the $V_{low}$ DC voltage and the location 258 is empty) the processor cannot use linear interpolation to identify the output current command for the torque command $T_{cmd}$, DC voltage measurement $V_{meas}$, and motor speed $\omega_r$. Accordingly, an alternate method of determining the output current command 132 for the point 212 (location 258) must be used.

Figure 3:
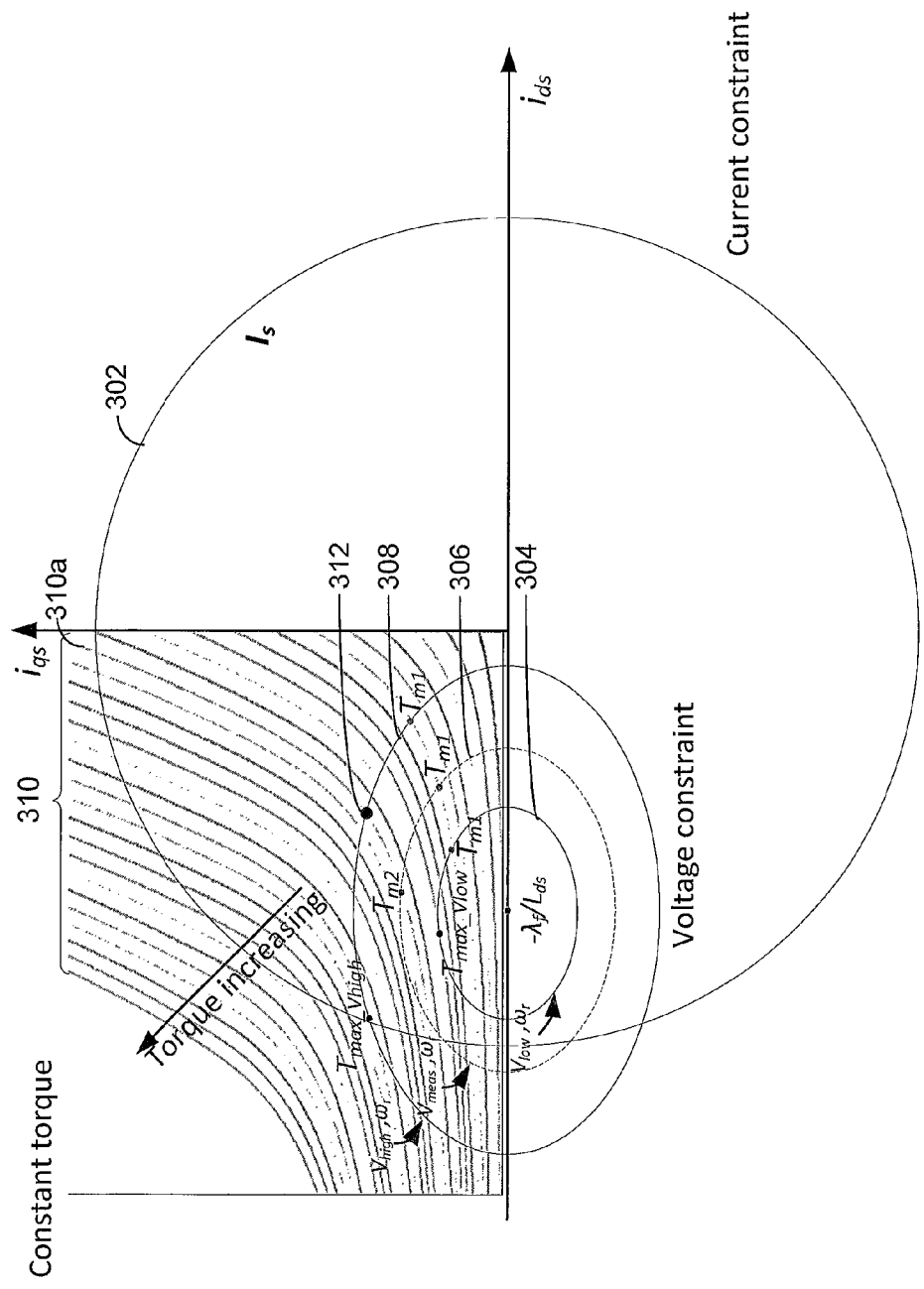
FIG. 3 shows a graph including constant torque curves, current constraints of the IPM motor drive system and voltage constraints of the IPM motor drive system.

FIG. 3 shows a graph including constant torque curves, current constraints of the IPM motor drive system and voltage constraints of the IPM motor drive system. The graph 300 shows current and voltage polar plots in d-q coordinate space. The graph 300 shows an $i_{ds}$ axis in the x-axis direction and an $i_{qs}$ axis in the y-axis direction. The graph 300 also shows a circular polar plot (circular plot) 302 which represents a current constraint of the IPM motor drive system. The graph 300 shows elliptical polar plots (elliptical plots) 304, 306, and 308 representing voltage constraints of the IPM motor drive system. Torque lines 310 represent individual torque commands corresponding to different $i_{ds}$ and $i_{qs}$ values that will generate the corresponding torque values. The torque along each of these torque lines 310 is constant. Point(s) of intersection and overlap of the elliptical plots 304, 306, and 308 and the torque lines 310 indicate that the voltages and speeds corresponding to the elliptical plots 304, 306, and 308 are capable of generating output current commands for the torque commands of the overlapping torque lines 310. The torque lines 310 correspond to the torque commands 120 ($T_{cmd}$ of FIG. 1), the voltages of the elliptical plots 304, 306, and 308 correspond to the voltages of the lookup tables and the DC voltage measurement 130 ($V_{low}$, $V_{high}$, $V_{meas}$ of FIG. 2), and the speed corresponds to the motor speed feedback 124 (FIG. 1).

The voltage determination equations of an IPM synchronous motor in a standard (d,q) state-space mathematical model reference frame are shown below in Equations 2. Equation 3 below calculates a torque of the same reference frame:

$$V_{ds} = R_s i_{ds} + L_{ds}\frac{di_{ds}}{dt} - \omega_e L_{qs} i_{qs} \qquad \text{(Equations 2)}$$

$$V_{qs} = R_s i_{qs} + L_{qs}\frac{di_{qs}}{dt} + \omega_e L_{ds} i_{ds} + \omega_e \lambda_f$$

$$T = \frac{3}{2} n_p (\lambda_f i_{qs} + (L_{ds} - L_{qs}) i_{qs} i_{ds}) \qquad \text{(Equation 3)}$$

For these equations, $R_s$ corresponds to the stator resistance, $\omega_e$ is rotational speed of the electric motor, $n_p$ is number of pole pairs, $V_{ds}$ and $V_{qs}$ are d-axis and q-axis stator voltages, respectively, $i_{ds}$ and $i_{qs}$ are d-axis and q-axis stator currents, respectively, and $L_{ds}$ and $L_{qs}$ are the stator inductances in the d- and q-axes rotor reference frame, respectively. $\lambda_f$ corresponds to a permanent magnet flux linkage (e.g., torque constant) and T corresponds to the motor torque.

A d-q set of axes referenced are the axes in a (d,q) coordinate system. The d-axis (the direct axis), generally corresponds to an axis of a rotor magnet pole. The q-axis, (the quad axis), generally includes the axis at an angle of 90 degrees from the d-axis. When the rotor is stationary, the (d,q) coordinate system is a stationary reference frame. When the rotor starts rotating, the system is a rotor reference frame where the (d,q) coordinate system rotates at the rotor speed.

At steady state, the derivatives of Equations 2 are zero and the Equations 2 simplify to form Equations 4 below:

$$V_{ds} = R_s i_{ds} - \omega_e L_{qs} i_{qs}$$

$$V_{qs} = R_s i_{qs} + \omega_e L_{ds} i_{ds} + \omega_e \lambda_f \qquad \text{(Equations 4)}$$

Voltage and current ratings of the IPM motor and the PWM inverter may limit torque and speed of IPM motor controlled by the PWM inverter. The maximum phase voltage $V_{s\_max}$ may be determined based on the DC link voltage and may be calculated according to Equation 5 below:

$$V_{ds}^2 + V_{qs}^2 \leq V_{s\_max}^2 \qquad \text{(Equation 5)}$$

Thus, the maximum phase voltage $V_{s\_max}$ may correspond to the total voltage from the combination of the $V_d$ and $V_q$ voltages.

The maximum current $I_{s\_max}$ available to the IPM motor and the PWM inverter limits the current of the inverter and the motor, shown by Equation 6.

$$i_{ds}^2 + i_{qs}^2 \leq I_{s\_max}^2 \quad \text{(Equation 6)}$$

Thus, the maximum phase current $i_{s\_max}$ may correspond to the total current from the combination of the $i_d$ and $i_q$ currents.

Equations 4 may be inserted into Equation 6, and the stator resistance can generally be neglected in field-weakening regions and calculations where the rotational speed is high. Accordingly, Equation 7, which produces the voltage constraints, reduces as follows:

$$L_{ds}^2 \left( i_{ds} + \frac{\lambda_f}{L_{ds}} \right)^2 + L_{qs}^2 i_{qs}^2 \leq \left( \frac{V_{s\,max}}{n_p \omega_r} \right)^2 \quad \text{(Equation 7)}$$

The $V_{ds}^2$ term of Equation 5 is replaced with the $V_{ds}$ equation of Equations 4, while the $V_{qs}^2$ term of Equation 5 is replaced with the $V_{qs}$ equation of Equations 4. The $V_{s\_max}^2$ term on the right-hand side of the Equation 7 now depicts a ratio of maximum phase voltage and speed. The resulting ratio of the maximum phase voltage and speed may be replaced with various combinations of other voltages and speeds. From FIG. 3 described above, the point $T_{m2}$ corresponds to the current $(i_d, i_q)$ needed to generate the torque line 310a at the DC voltage measurement 130 $V_{meas}$ at the motor speed $\omega_r$. As shown, the ellipse 308 (corresponding to $V_{high}$, $\omega_r$) is larger than the ellipse 306 (corresponding to $V_{meas}$, $\omega_r$), which is larger than ellipse 304 (corresponding to $V_{low}$, $\omega_r$). The ellipse 308 may be adjusted to match the ellipse 306 by either reducing the voltage $V_{high}$ and maintaining the speed $\omega_r$ or maintaining the voltage $V_{high}$ and increasing the speed $\omega_r$ based on the voltage ellipse equations. Accordingly, the $\omega_{high}$ can be calculated based on known $V_{meas}$, $V_{high}$, and $\omega_r$ via Equation 8 below, which comes from the voltage ellipse equations:

$$\omega_{high} = \frac{V_{high}}{V_{meas}} \omega_r \quad \text{(Equation 8)}$$

Accordingly, because the voltage constraint ellipse for $V_{meas}$ and $\omega_r$ is the same size as the voltage ellipse for $V_{high}$ and $\omega_{high}$, Equation 9 below may be generated from Equations 7 and 8:

$$L_{ds}^2 \left( i_{ds} + \frac{\lambda_f}{L_{ds}} \right)^2 + L_{qs}^2 i_{qs}^2 \leq \left( \frac{V_{meas}}{n_p \omega_r} \right)^2 = \left( \frac{V_{high}}{n_p \omega_{high}} \right)^2 \quad \text{(Equation 9)}$$

Thus, the output current command at $V_{meas}$ may be determined based on the output current command at $V_{high}$ for a higher speed $\omega_{high}$ than $\omega_r$ for the same torque command.

Similarly, as the ellipse 304 may be adjusted to match the ellipse 306 by either increasing the voltage $V_{low}$ and maintaining the speed $\omega_{low}$ or maintaining the voltage $V_{low}$ and decreasing the speed $\omega_{low}$ based on the voltage ellipse equations, the output current command at $V_{meas}$ may be determined based on the output current command at $V_{low}$ for a lower speed $\omega_{low}$ than $\omega_r$ for the same torque command. Accordingly, the $\omega_{low}$ can be calculated based on known $V_{meas}$, $V_{low}$, and $\omega_r$ via Equation 10 below, which also comes from the voltage ellipse equations:

$$\omega_{low} = \frac{V_{low}}{V_{meas}} \omega_r \quad \text{(Equation 10)}$$

Accordingly, because the voltage constraint ellipse for $V_{meas}$ and $\omega_r$ is the same size as the voltage ellipse for $V_{low}$ and $\omega_{low}$, Equation 11 below may be generated from Equations 7 and 10:

$$L_{ds}^2 \left( i_{ds} + \frac{\lambda_f}{L_{ds}} \right)^2 + L_{qs}^2 i_{qs}^2 \leq \left( \frac{V_{meas}}{n_p \omega_r} \right)^{20} = \left( \frac{V_{low}}{n_p \omega_{low}} \right)^2 \quad \text{(Equation 11)}$$

Figure 4A:
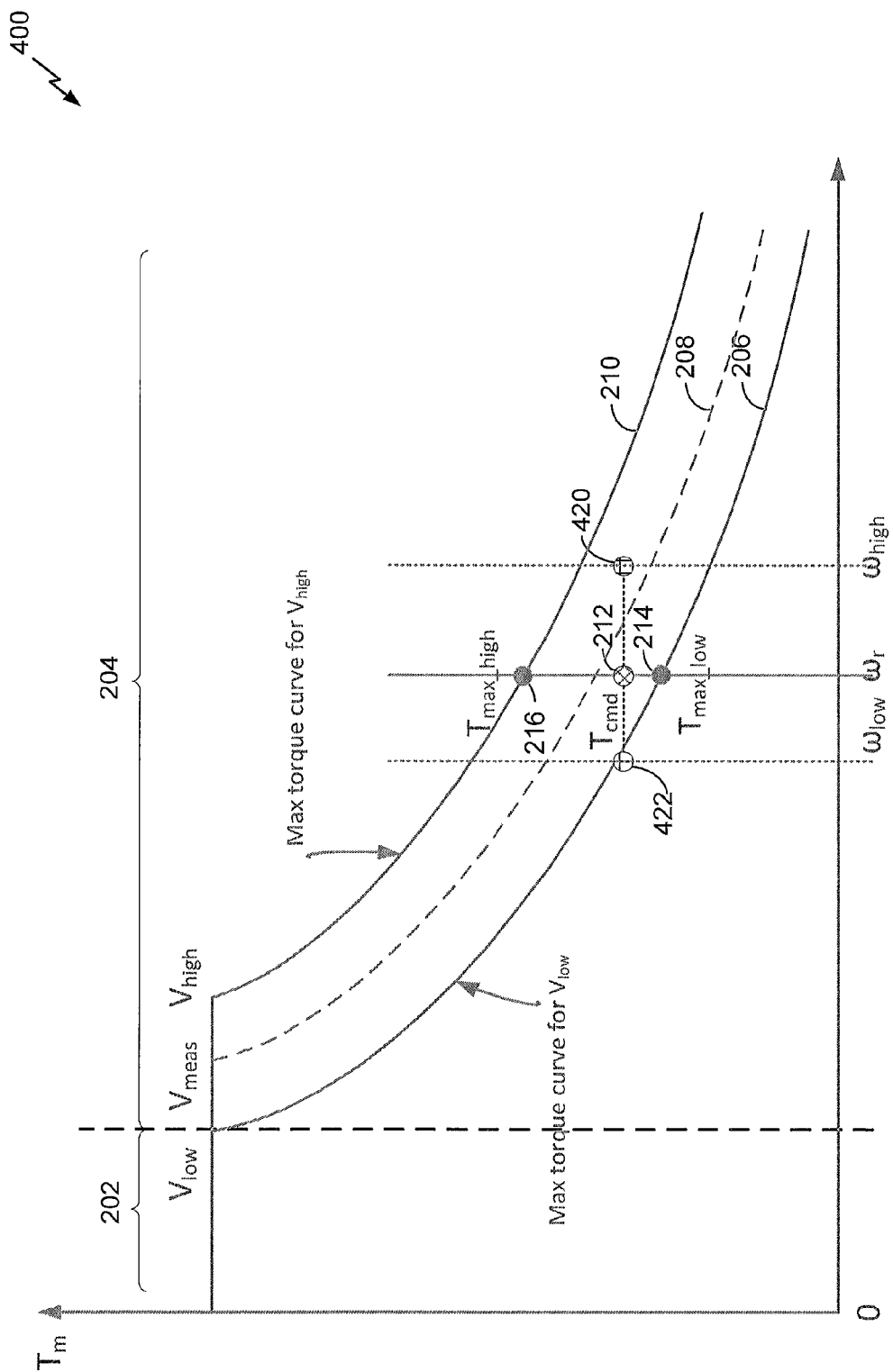
FIG. 4a shows a graph including motor torque curves for the IPM motor drive system at a plurality of voltages indicating current lookup using an extrapolated motor speed.

FIG. 4a shows a graph including motor torque curves for the IPM motor drive system at a plurality of voltages indicating current lookup using an extrapolated motor speed. The graph 400 includes many of the same features as graph 200 of FIG. 2 that will not be described again here. The graph 400 includes the point 212 at $T_{cmd}$ and $\omega_r$. Based on the discussion above, since the point 212 is above the $T_{max\_low}$ torque curve 214 for the $V_{low}$ lookup table, interpolation will not result in an accurate output current command for the given DC voltage measurement and motor speed feedback. However, using Equations 7 and 8 discussed above, the $V_{high}$ lookup table may be used to determine the output current commands at the $V_{high}$ voltage, $\omega_{high}$ motor speed, and torque command $T_{cmd}$. Point 420 depicts the point at $V_{high}$ having the speed $\omega_{high}$ and the same torque command $T_{cmd}$. Accordingly, the $V_{high}$ lookup table may be used with the speed $\omega_{high}$ and the torque command $T_{cmd}$ to identify the output current commands which, as shown by Equation 9 above, equates to the output current commands for the $V_{meas}$ at the speed $\omega_r$. Similarly, using Equations 10 and 11 discussed above, the $V_{low}$ lookup table may be used to determine the output current commands at the $V_{low}$ voltage, $\omega_{low}$ motor speed, and torque command $T_{cmd}$. Point 422 depicts the point at $V_{low}$ having the speed $\omega_{low}$ and the same torque command $T_{cmd}$. Accordingly, the $V_{low}$ lookup table may be used with the speed $\omega_{low}$ and the torque command $T_{cmd}$ to identify the output current commands which, as shown by Equation 11 above, equates to the output current commands for the $V_{meas}$ at the speed $\omega_r$.

Figure 4B:
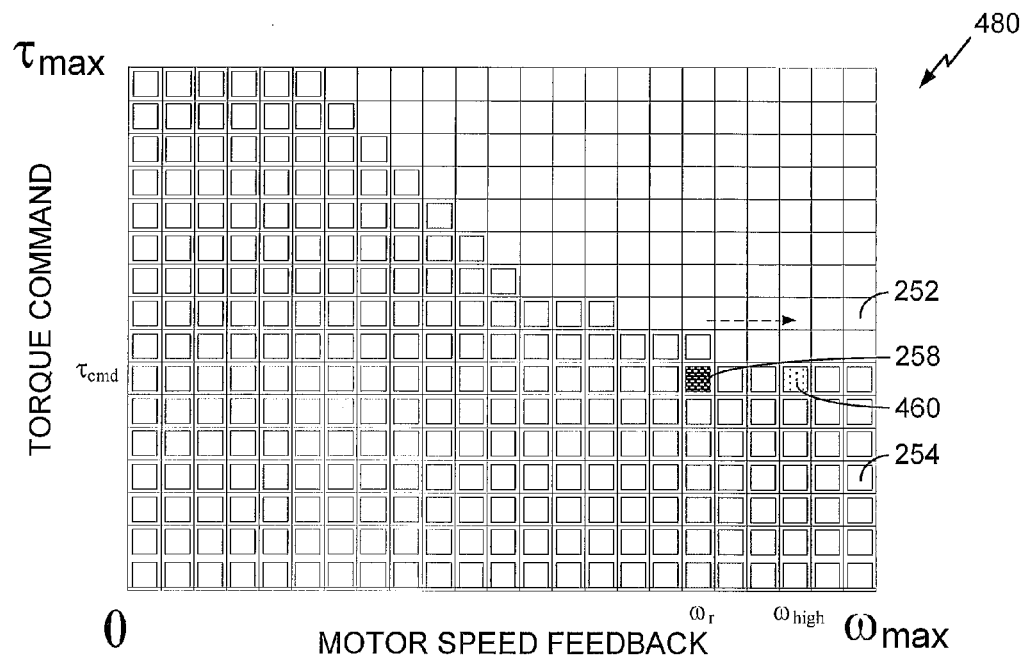
FIG. 4b shows a first lookup table ($V_{high}$) of output current command values roughly corresponding to the $V_{high}$ motor torque curve of FIG. 4a and showing the extrapolated motor speed for $V_{high}$ that corresponds to the $V_{meas}$ and $\omega_r$.

FIG. 4b shows a first lookup table ($V_{high}$) of output current command values roughly corresponding to the $V_{high}$ motor torque curve of FIG. 4a and showing the extrapolated motor speed for $V_{high}$ that corresponds to the $V_{meas}$ and $\omega_r$. The lookup table 480 can include many of the same features as lookup table 280 of FIG. 2 that will not be described again here. FIG. 4b shows how the $V_{high}$ lookup table may be used to determine the output current command for the $V_{meas}$, $\omega_r$, and $T_{cmd}$ inputs where interpolation is not an option, as described above in relation to Equations 7-9. As noted above, given Equation 8, $V_{meas}$, $\omega_r$, and $V_{high}$ may be used to identify the speed $\omega_{high}$. Because the voltage constraint ellipse formed by the $V_{high}$, $\omega_{high}$ will directly overlap with the voltage constraint ellipse formed by $V_{meas}$, $\omega_r$, the output current command at $V_{high}$, $\omega_{high}$ is equal to the output current command at $V_{meas}$, $\omega_r$. Accordingly, the output current command of location 460 of the $V_{high}$ lookup table ($V_{high}$, $\omega_{high}$) is equal to the output current command of ($V_{meas}$, $\omega_r$) for the torque command $T_{cmd}$.

Figure 4C:
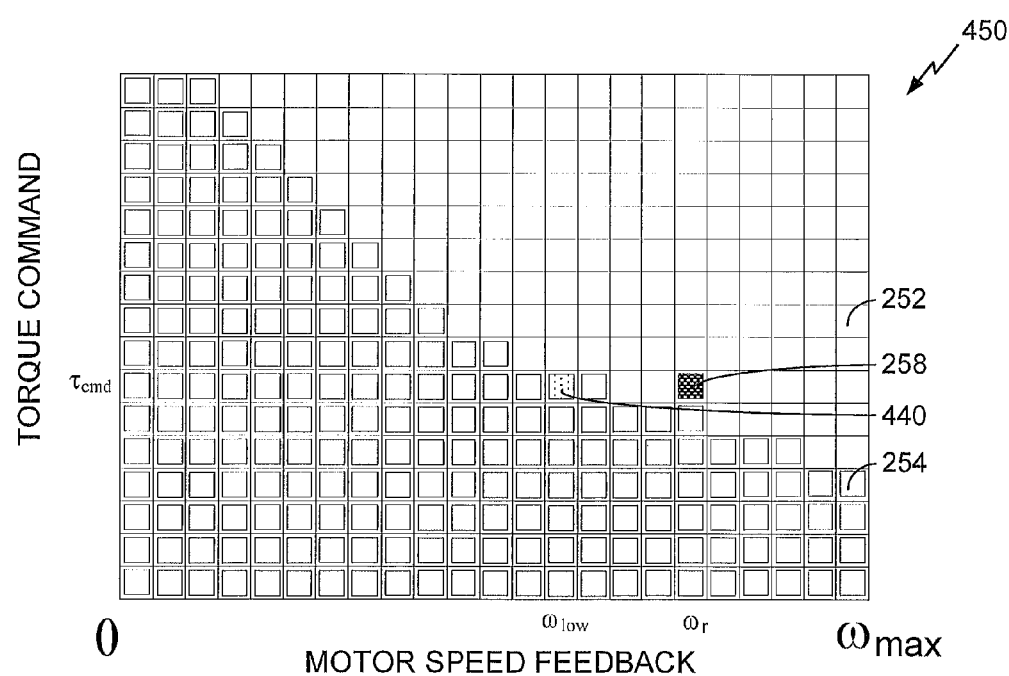
FIG. 4c shows a second lookup table ($V_{low}$) of output current command values roughly corresponding to the $V_{high}$ motor torque curve of FIG. 4a and showing the extrapolated motor speed for $V_{low}$ that corresponds to the $V_{meas}$ and $\omega_r$.

FIG. 4c shows a second lookup table ($V_{low}$) of output current command values roughly corresponding to the $V_{high}$ motor torque curve of FIG. 4a and showing the extrapolated motor speed for $V_{low}$ that corresponds to the $V_{meas}$ and $\omega_r$.

The lookup table 450 can include many of the same features as lookup table 250 of FIG. 2 that will not be described again here. FIG. 4c shows how the $V_{low}$ lookup table may be used to determine the output current command for the $V_{meas}$, $\omega_r$, and $T_{cmd}$ inputs where interpolation is not an option, as described above in relation to Equations 10-11. As noted above, given Equation 10, $V_{meas}$, $\omega_r$, and $V_{low}$ may be used to identify the speed $\omega_{low}$. Because the voltage constraint ellipse formed by the $V_{low}$, $\omega_{low}$ will directly overlap with the voltage constraint ellipse formed by $V_{meas}$, $\omega_r$, the output current command at $V_{low}$, $\omega_{low}$ is equal to the output current command at $V_{meas}$, $\omega_r$. Accordingly, the output current command of location 440 of the $V_{low}$ lookup table ($V_{low}$, $\omega_{low}$) is equal to the output current command of ($V_{meas}$, $\omega_r$) for the torque command $T_{cmd}$.

While the methods and apparatus for generating current commands for an interior permanent magnet (IPM) motor described above are discussed in relation and applicability to the field weakening region of the IPM motor, these same methods and apparatus function similarly in the constant torque region of the IPM motor. Accordingly, the current command identification within the constant torque region of the IPM described as currently being performed using lookup tables may instead be performed using the current command generation equations described above. Instead of interpolating the current commands as described by Equation 1 above, the current commands may instead by identified using Equations 9 and 11.

Use of Equations 9 and 11 to generate the current commands may reduce the number of lookup tables required. Reducing the number of lookup tables reduces the amount of memory dedicated to lookup tables, the time required to perform the initial testing processes used to generate the lookup tables, and the amount of time required to identify the current using the lookup tables, as less time is spent identifying appropriate lookup tables, etc. In some embodiments, the lookup tables stored in the memory may be replaced with two lookup tables, one for the lowest possible minimum voltage for the system and one for the highest possible maximum voltage for the control system. Based on these two lookup tables, the control system may generate the current commands for any voltage between the minimum and maximum voltages using Equations 9 and 11. The methods discussed herein may work for the entire torque speed range. In some embodiments, the lookup tables stored in the memory may be replaced with a single lookup table, for example at the maximum or minimum voltage for the control system. From the single lookup table, the Equations 7-9 or 10-11 may be used to identify the current commands for any DC voltage measurements. As discussed above, the output current command ($i_{ds}, i_{qs}$) is ideal, estimated values identified during initial testing processes. Accordingly, these pre-calibrated and/or stored output current commands may not account for real world constraints. In some situations, the output current command ($i_{ds}, i_{qs}$) may need to be corrected to avoid issues that may arise when current commands that exceed the voltage constraints of the IPM are applied to the IPM.

Figure 5:
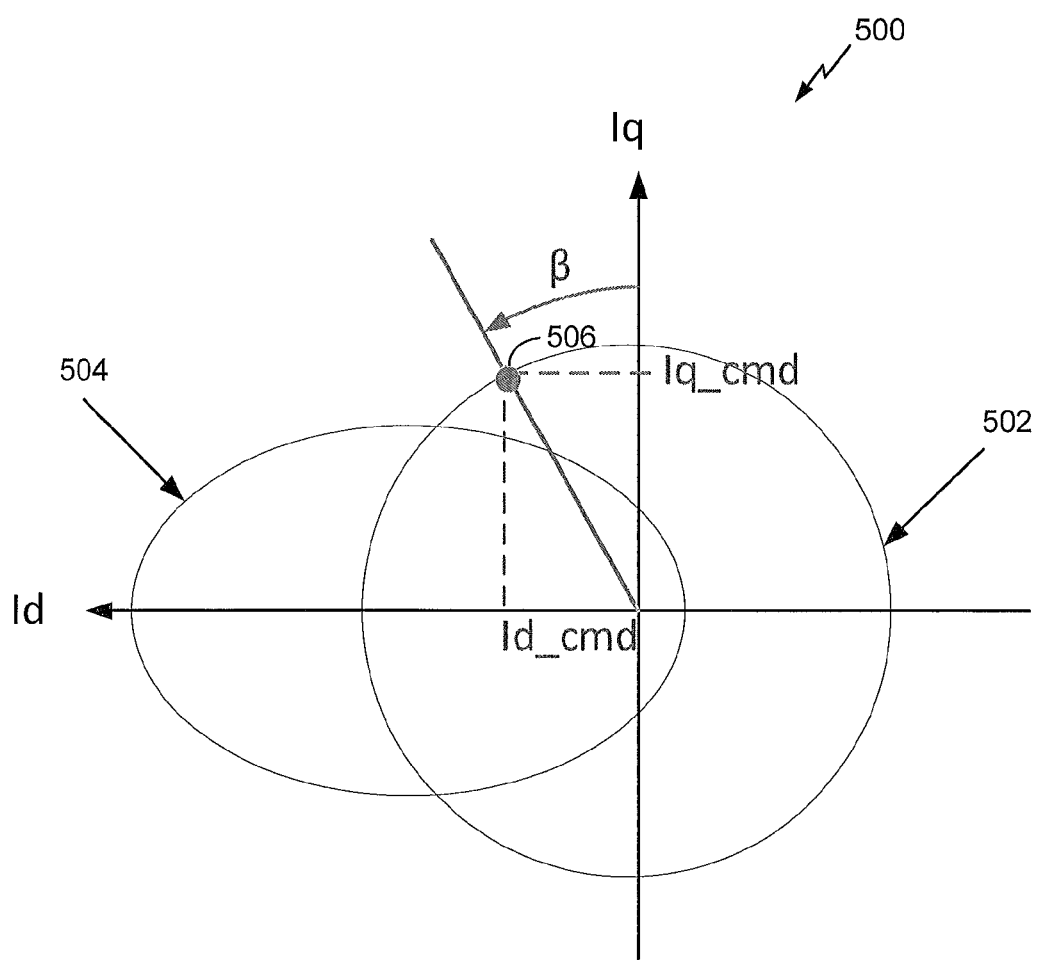
FIG. 5 shows a graph including a current constraint circle of the IPM motor drive system and a voltage limit constraint of the IPM motor drive system.

FIG. 5 shows a graph including a current constraint circle of the IPM motor drive system and a voltage limit constraint of the IPM motor drive system. The graph 500 includes a current constraint circle 502 (similar to the circular plot 302 of FIG. 3) and a voltage ellipse constraint 504 (similar to the elliptical plots 304, 306, and 308). Operating points for the IPM motor operating according to the constraints shown in graph 500 should be in the area where the current circle 502 and the voltage ellipse 504 overlap. Ideally, the ($i_{ds}, i_{qs}$) current command output from the lookup tables discussed above should conform to the depicted current and voltage constraints (e.g., a point corresponding to the ($i_{ds}, i_{qs}$) current command output should lie within the area of overlap) in order to maintain complete control of the motor at all speeds.

The graph 500 also includes the output current command ($i_{d\_cmd}, i_{q\_cmd}$), which is shown as being on the perimeter of the current circle 502 but not on or within the voltage ellipse 504. Therefore, graph 500 depicts a scenario where the output current command ($i_{d\_cmd}, i_{q\_cmd}$) (e.g., point 506) does not meet the voltage constraints. Errors that cause the output current command to lie outside the current and voltage constraints may include error in interpolations and calculations described above, voltage measurement errors that may occur during initial testing and control table characterization processes (e.g., voltage drop differences between calculated and real world systems, thermal effects, etc.). Accordingly, the output current command ($i_{d\_cmd}, i_{q\_cmd}$) may be corrected to find the optimum operating point within the voltage constraints and at the same time maintain torque linearity.

Figure 6:
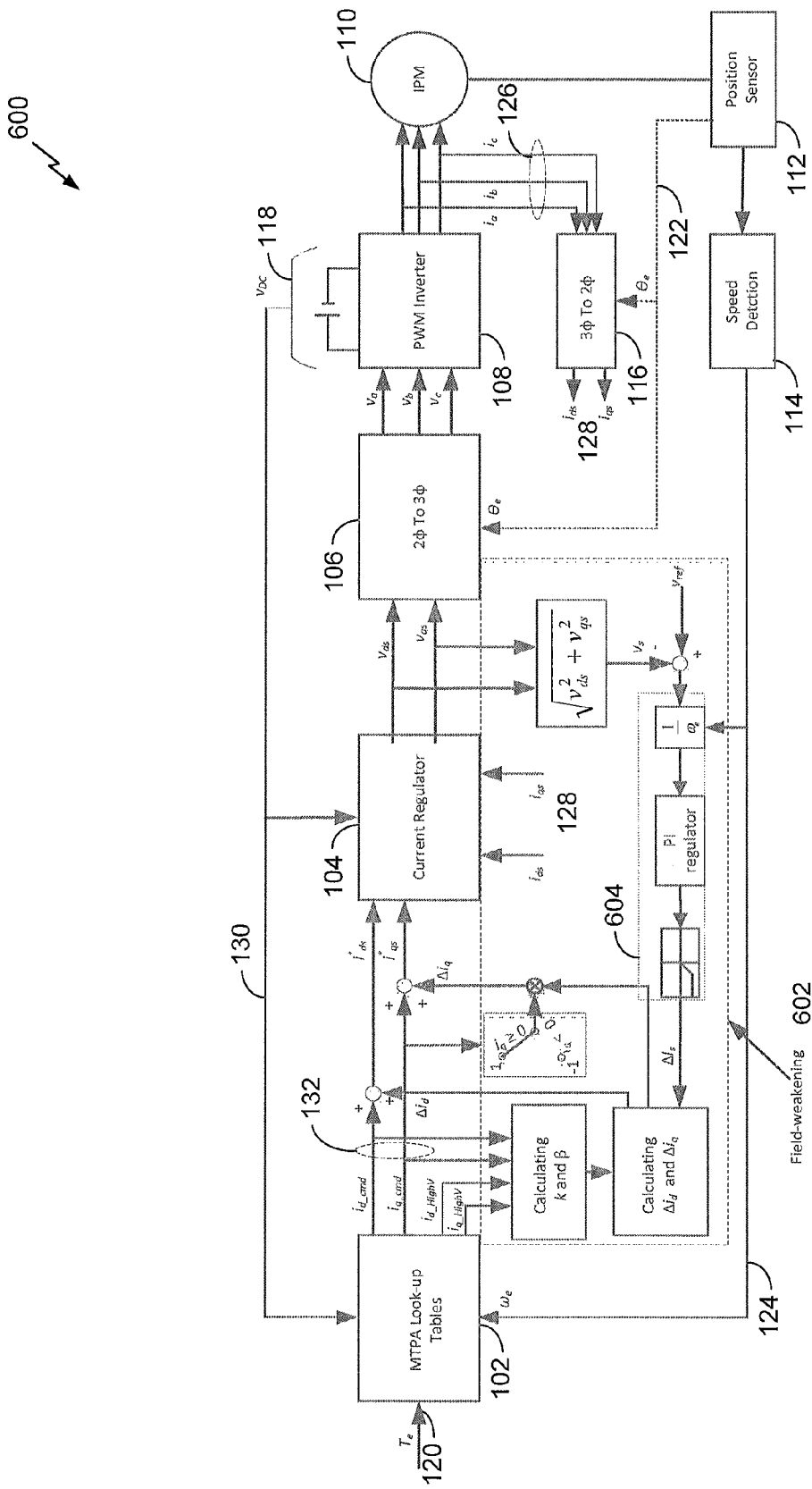
FIG. 6 shows a block diagram of an exemplary motor drive control system, such as that used in an internal permanent magnet (IPM) motor drive system, similar to that of FIG. 1, including a field weakening correction system.

FIG. 6 shows a block diagram of an exemplary motor drive control system, such as that used in an internal permanent magnet (IPM) motor drive system, similar to that of FIG. 1, including a field weakening correction system. The IPM motor drive system 600 can include many of the same components and features as IPM motor drive system 100, which will not be described again here. The system 600 can also include a field-weakening correction circuit 602. The field-weakening correction circuit 602 can include various components 604 as shown. However, one or more of these components 604 may be removed or replaced or additional components may be used to affect the same outcome as described herein. Correcting the output current command ($i_{d\_cmd}, i_{q\_cmd}$) may begin with identifying the output voltage command ($V_{ds}, V_{qs}$) corresponding to the output current command. In system 600, the output voltage command ($V_{ds}, V_{qs}$) is shown corresponding to the output current command ($i_{d\_cmd}, i_{q\_cmd}$) at the output of the current regulator 104. However, in some embodiments, the voltage command may be monitored or acquired at any other point within the system 600. Based on Equation 5 above, the magnitude of the phase voltage $V_s$ may be calculated based on the commanded ($V_{ds}, V_{qs}$) using Equation 12 below:

$$v_s = \sqrt{v_{ds}^2 + v_{qs}^2} \qquad \text{(Equation 12)}$$

As shown by the field weakening circuit 602, the magnitude of the phase voltage, once calculated by Equation 12, can be reduced by the reference voltage, $V_{ref}$, which corresponds to the actual voltage at the motor 110 as limited by the PWM inverter 108. The identified difference between the magnitude of the phase voltage $V_s$ and the reference voltage $V_{ref}$ can then be manipulated to identify the total phase current delta needed to adjust the output current command ($i_{d\_cmd}, i_{q\_cmd}$) to push the magnitude of the phase voltage $V_s$ within the voltage ellipse 504 (FIG. 5), which corresponds to finding the optimum operating point within the voltage constraints. The phase current delta, $\Delta I_s$, may be limited to negative calibration values. As shown in system 600, the phase current delta, $\Delta I_s$, is identified by normalizing the difference between the magnitude of the phase voltage $V_s$ and the reference voltage $V_{ref}$ by the electrical speed $\omega_e$ and applying a proportional-integral (PI) regulator to the normalized difference. In some embodiments, other methods and components may be used to identify the phase current delta from the magnitude of the phase voltage $V_s$ and the reference voltage $V_{ref}$. Once the phase current delta, $\Delta I_s$, is identified, the $\Delta I_d$ and $\Delta I_q$ values are identified from the phase current delta.

Figure 7:
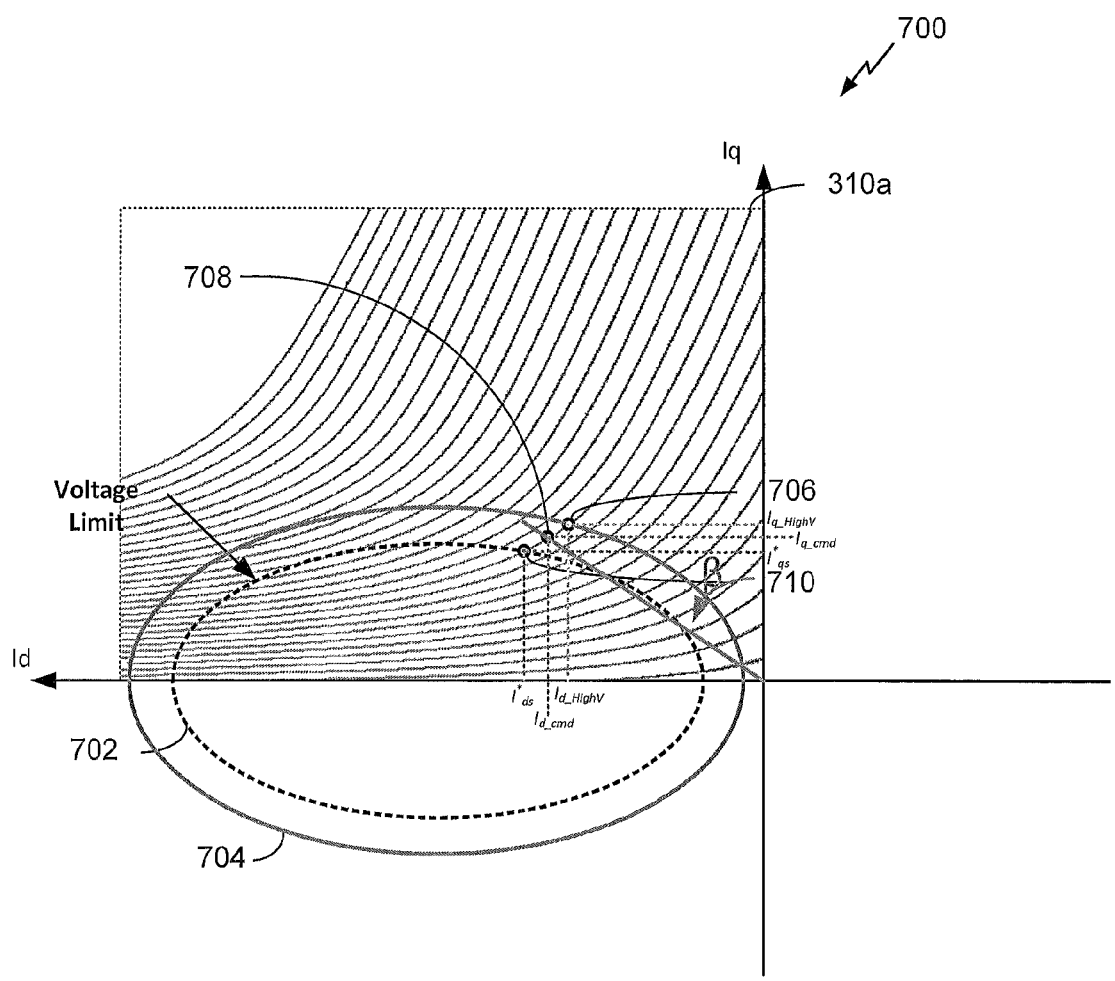
FIG. 7 depicts a graph including constant torque curves, two voltage constraint ellipses, and three points corresponding to three current output commands along a single constant torque curve.

FIG. 7 depicts a graph including constant torque curves, two voltage constraint ellipses, and three points corresponding to three current output commands along a single constant torque curve. The graph 700 depicts a first voltage constraint ellipse 702 and a second voltage constraint ellipse 704. The graph 700 also depicts the three current output commands corresponding to points 706, 708, and 710. The three points 706, 708, and 710 are all along the constant torque curve 310a. The first ellipse 702 corresponds to the voltage constraints of the DC voltage measurement $V_{ref}$, which may correspond to the actual voltage reference of the IPM motor 110 and PWM inverter 108 when the output current command is determined from the lookup table(s). The second ellipse 704 corresponds to the voltage constraints of the $V_{high}$ voltage. The point 706 corresponds to the output current command ($i_{d\_HighV}, i_{q\_HighV}$) where the $V_{high}$ voltage of the second ellipse 704 intersects the torque curve 310a. The point 708 corresponds to the output current command ($i_{d\_cmd}, i_{q\_cmd}$), which corresponds to the pre-calculated output current command for the DC voltage measurement $V_{meas}$ at the torque command of torque curve 310a. The point 710 corresponds to the output current command ($i^*_{ds}$, $i^*_{qs}$) where the first ellipse 702 (corresponding to the actual $V_{meas}$ voltage constraints) intersects the torque curve 310a of the torque command.

The output current command ($i_{d\_cmd}, i_{q\_cmd}$) of point 708 may be determined based on identifying the output current command in a lookup table based on torque command, DC voltage measurement, and motor speed feedback inputs, interpolating values from lookup tables that are above and below a DC voltage measurement, or calculated based on a voltage at a higher motor speed feedback or at a lower voltage at a lower motor speed feedback, as discussed above. Since the output current command ($i_{d\_cmd}, i_{q\_cmd}$) of point 308 is outside the first ellipse 702, the output current command ($i_{d\_cmd}, i_{q\_cmd}$) may be adjusted to move within or on the voltage constraints of the first ellipse 702. If the output current command ($i_{d\_cmd}, i_{q\_cmd}$) is within or on the voltage constraints of the first ellipse 702, the output current command ($i_{d\_cmd}, i_{q\_cmd}$) does not need to be adjusted because there is no risk of losing control of the IPM motor 110 at voltages and currents within the constraints.

Accordingly, decreasing the $i_{qs}$ component and increasing the $i_{ds}$ component of the output current command along the constant torque line 310a from the point 708 to the point 710 will bring the output current command within the voltage constraints of the first ellipse 702 and maintain the torque production. As discussed above, output current commands for a given torque command can be determined for higher voltage than the reference voltage $V_{ref}$ and the DC measured voltage $V_{meas}$ (e.g. $V_b$, where $V_b > V_{ref}$ and/or $V_{meas}$), for example at output current command ($i_{d\_HighV}, i_{q\_HighV}$). As the voltage step from point 306 (e.g., ($i_{d\_HighV}, i_{q\_HighV}$)) to point 308 (e.g., ($i_{d\_cmd}, i_{q\_cmd}$)) is small, the curvature of the constant torque curve between the two points can be ignored and assumed to be linear to the ($i_{ds}, i_{qs}$) current changes. Accordingly, Equation 13 below provides for identifying the slope of the line between the two points 306 and 308, which can also be attributed to the line between the two points 308 (e.g., ($i_{d\_cmd}, i_{q\_cmd}$)) and 310 (e.g., ($i^*_{ds}, i^*_{qs}$)) due to its short length:

$$k = \frac{i_{q\_HighV} - i_{q\_cmd}}{i_{d\_HighV} - i_{d\_cmd}} = \frac{i_{q\_cmd} - i^*_q}{i_{d\_cmd} - i^*_d} \quad \text{(Equation 13)}$$

Let $\Delta I_q = i_{q\_cmd} - i^*_q$, $\Delta I_d = i_{d\_cmd} - i^*_d$, so $\Delta I_q = k \, \Delta I_d$ and Equations 14 always hold:

$$i_{d\_cmd}^2 + i_{q\_cmd}^2 = I_s^2$$

$$(i_{d\_cmd} + \Delta I_d)^2 + (i_{q\_cmd} + \Delta I_q)^2 = (I_s + \Delta I_s)^2 \quad \text{(Equations 14)}$$

Expanding Equation 14 provides Equation 14-1:

$$i_{d\_cmd}^2 + 2 i_{d\_cmd} \Delta I_d + \Delta I_d^2 + i_{q\_cmd}^2 + 2 i_{q\_cmd} \Delta I_q + \Delta I_q^2 = I_s^2 + 2 i_s \Delta I_s + \Delta I_s^2 \quad \text{(Equation 14-1)}$$

Since $\Delta I_d$, $\Delta I_q$, and $\Delta I_s$ are quite small compare to $i_{d\_cmd}$, $i_{q\_cmd}$, and $i_s$, $\Delta I_d^2$, $\Delta I_q^2$, $\Delta I_s^2$ can be neglected. Also, $i_{q\_cmd} = I_s \cos \beta$, $i_{d\_cmd} = I_s \sin \beta$. $\beta$ is shown in FIG. 7 to be the angle between the Iq axis and a line that passes from the origin (0,0) on the (d,q) axis and the current command point ($i_{d\_cmd}, i_{q\_cmd}$). $I_s$ may be the length of the line from the origin (0,0) on the (d,q) axis to the current command point ($i_{d\_cmd}, i_{q\_cmd}$). Thus, $I_s$ may be identified based on the ($i_{d\_cmd}, i_{q\_cmd}$) and the angle $\beta$. The angle $\beta$ may be identified from the current command point ($i_{d\_cmd}, i_{q\_cmd}$) using Equations 14-2:

$$\beta = \tan^{-1} \frac{i_{d\_cmd}}{i_{q\_cmd}} \quad \text{(Equation 14-2)}$$

After simplification, $\Delta I_d$ and $\Delta I_q$ can be calculated as shown by Equation 15:

$$\Delta I_d = \frac{1}{\sin \beta + k \cos \beta} \Delta I_s \quad \text{(Equation 15)}$$

$$\Delta I_q = \frac{k}{\sin \beta + k \cos \beta} \Delta I_s$$

The phase current delta, $\Delta I_s$, is output from the field weakening circuit 602 as $\Delta I_d$ and $\Delta I_q$ adjustments to the output current command ($i_{d\_cmd}, i_{q\_cmd}$). An alternative solution can also be used if computational throughput is a significant concern. In practical case, $\Delta I_d$ and $\Delta I_q$ obtained using equations (16) will be sufficient to move the operating point inside the voltage limit along, and maintain the torque production at the same time.

$$\Delta I_d = \frac{1}{1+k} \Delta I_s \quad \text{(Equation 16)}$$

$$\Delta I_q = \frac{k}{1+k} \Delta I_s$$

Accordingly, the final output current commands, compensating for the corrections discussed above, can be calculated via Equations 17:

$$i^*_{ds} = i_{d\_cmd} + \Delta I_d$$

$$i^*_{qs} = i_{q\_cmd} + \Delta I_q \quad \text{(Equation 17)}$$

In the analysis above, the $i_{ds}$ current delta may be a negative value, because the current may be adjusted to increase the $i_{ds}$ current, which would require an additional −negative $i_{ds}$ as the $i_{ds}$ current increases along the negative axis. Alternatively, the $i_{qs}$ current delta may be either negative or positive. The $i_{qs}$ current delta may be negative when the command current is positive, thus reducing the $i_{qs}$ current. When the command current is negative (for example when braking the motor), the $i_{qs}$ current delta may be positive to reduce the negative $i_{qs}$ current.

The foregoing description details certain implementations of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the development should not be taken to imply that the terminology is being re-defined herein to be restricted to including any specific characteristics of the features or aspects of the technology with which that terminology is associated.

The technology is operational with numerous other general purpose or special purpose computing system environments or configurations. Examples of well-known computing systems, environments, and/or configurations that may be suitable for use with the development include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX® or Microsoft Windows®.

The system control may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system control may also be written using interpreted languages such as Perl, Python or Ruby.

Those of skill will further recognize that the various illustrative logical blocks, modules, circuits, and algorithm steps described in connection with the implementations disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present development.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

The foregoing description details certain implementations of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the development should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the implementations. It will also be appreciated by those of skill in the art that parts included in one implementation are interchangeable with other implementations; one or more parts from a depicted implementation can be included with other depicted implementations in any combination. For example, any of the various components described herein and/or depicted in the Figures may be combined, interchanged or excluded from other implementations.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present development. At the very least, and not as an attempt to limit the application of the doctrine of equivalents to the scope of the claims, each numerical parameter should be construed in light of the number of significant digits and ordinary rounding approaches.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. An apparatus comprising:
a motor;
an inverter configured to provide input power to the motor;
a DC power bus configured to provide input power to the inverter;
a data store comprising information defining inverter currents for producing different motor torque outputs at different motor speeds and different DC power bus voltages; and
a processor configured to:
receive a torque command, a DC power bus voltage measurement, and a motor speed measurement;
determine, using the data store, an inverter current command based at least in part on the torque command, the DC power bus voltage measurement, and the motor speed measurement;
modify the inverter current command, wherein modifying the inverter current command comprises:
identifying a torque curve defined by the torque command;
identifying a slope of a line running through a first point on the torque curve corresponding to the inverter current command and a second point on the torque curve corresponding to a second inverter current command; and
modifying the inverter current command to be different from the inverter current command and the second inverter current command based on the identified slope within voltage constraints of the motor; and
control the inverter based at least in part on the modified inverter current command.

2. The apparatus of claim 1, wherein modifying the inverter current command comprises increasing a first component of the inverter current command and decreasing a second component of the inverter current command.

3. The apparatus of claim 1, wherein modifying the inverter current command comprises increasing both a first and a second component of the inverter current command.

4. The apparatus of claim 1, wherein the processor is further configured to determine a total current delta for which the inverter current command is to be modified to be within the voltage constraint of the motor.

5. The apparatus of claim 1, wherein the processor is further configured to determine, using the data store, a second inverter current command based at least in part on the torque command, a DC power bus value greater than the DC power bus voltage measurement, and the motor speed measurement.

6. The apparatus of claim 5, wherein the modifying is based at least in part on the inverter current command to be modified and the second inverter current command.

7. The apparatus of claim 1, wherein modifying the inverter current command comprises adjusting a first component of the inverter current command according to $$\Delta I_d = \frac{1}{1+k} \Delta I_s$$

and a second component of the inverter current command according to $$\Delta I_q = \frac{k}{1+k} \Delta I_s,$$

wherein $\Delta I_s$ is a phase current delta, $\Delta I_d$ is a change in a first stator current, $\Delta I_q$ is a change in a second stator current, and k is the slope.

8. The apparatus of claim 1, wherein modifying the inverter current command comprises adjusting a first component of the inverter current command according to $$\Delta I_d = \frac{k}{\sin\beta + k\cos\beta} \Delta I_s$$

and a second component of the inverter current command according to $$\Delta I_q = \frac{k}{\sin\beta + k\cos\beta} \Delta I_s,$$

wherein $\Delta I_s$ is a phase current delta, $\Delta I_d$ is a change in a first stator current, $\Delta I_q$ is a change in a second stator current, k is the slope, and $\beta$ is an angle based on the inverter current command.

9. A method comprising:
receiving a torque command, a DC power bus voltage measurement, and a motor speed measurement;
determining, using a data store, an inverter current command based at least in part on the torque command, the DC power bus voltage measurement, and the motor speed measurement, wherein the data store comprises information defining inverter currents for producing different motor torque outputs at different motor speeds and different DC power bus voltages;
modifying the inverter current command in accordance with a voltage constraint of the motor, wherein modifying the inverter current command comprises:
identifying a torque curve defined by the torque command;
identifying a slope of a line running through a first point on the torque curve corresponding to the inverter current command and a second point on the torque curve corresponding to a second inverter current command, and
modifying the inverter current command to be different from the inverter current command and the second inverter current command based on the identified slope; and
controlling an inverter based at least in part on the determined inverter current command.

10. The method of claim 9, wherein modifying the inverter current command comprises increasing a first component of the inverter current command and decreasing a second component of the inverter current command.

11. The method of claim 9, wherein modifying the inverter current command comprises increasing both a first and a second component of the inverter current command.

12. The method of claim 9, further comprising determining a total current delta for which the inverter current command is to be modified to be within the voltage constraint of the motor.

13. The method of claim 9, further comprising determining, using the data store, a second inverter current command based at least in part on the torque command, a DC power bus value greater than the DC power bus voltage measurement, and the motor speed measurement.

14. The method of claim 13, wherein modifying the inverter current command is based at least in part on the inverter current command to be modified and the second inverter current command.

15. The method of claim 9, wherein modifying the inverter current command comprises adjusting a first component of the inverter current command according to $$\Delta I_d = \frac{1}{1+k} \Delta I_s$$

and a second component of the inverter current command according to $$\Delta I_q = \frac{k}{1+k} \Delta I_s,$$

wherein $\Delta I_s$ is a phase current delta, $\Delta I_d$ is a change in a first stator current, $\Delta I_q$ is a change in a second stator current, and k is the slope.

16. The method of claim 9, wherein modifying the inverter current command comprises adjusting a first component of the inverter current command according to $$\Delta I_d = \frac{k}{\sin\beta + k\cos\beta} \Delta I_s$$

and a second component of the inverter current command according to $$\Delta I_q = \frac{k}{\sin\beta + k\cos\beta} \Delta I_s,$$

wherein, $\Delta I_s$ is a phase current delta, $\Delta I_d$ is a change in a first stator current, $\Delta I_q$ is a change in a second stator current, k is the slope, and β is an angle based on the inverter current command.

17. An apparatus, comprising:
   means for driving;
   means for providing input power to the driving means;
   means for receiving a torque command, a DC power bus voltage measurement, and a motor speed measurement;
   means for determining an inverter current command, based at least in part on the torque command, the DC power bus voltage measurement, and the motor speed measurement, from information defining inverter currents for producing different motor torque outputs at different motor speeds and different DC power bus voltages;
   means for modifying the inverter current command in accordance with a voltage constraint of the motor, wherein the means for modifying the inverter current command comprises:
      means for identifying a torque curve defined by the torque command;
      means for identifying a slope of a line running through a first point on the torque curve corresponding to the inverter current command and a second point on the torque curve corresponding to a second inverter current command, and
      means for modifying the inverter current command to be different from the inverter current command and the second inverter current command based on the identified slope; and
   means for controlling an inverter based at least in part on the determined inverter current command.

18. The apparatus of claim 17, wherein the modifying means is configured to increase a first component of the inverter current command and decrease a second component of the inverter current command.

19. The apparatus of claim 17, wherein the modifying means is configured to increase both a first and a second component of the inverter current command.

20. The apparatus of claim 17, further comprising means for determining a total current delta for which the inverter current command is to be modified to be within the voltage constraint of the driving means.

21. The apparatus of claim 17, further comprising means for determining a second inverter current command, based at least in part on the torque command, a DC power bus value greater than the DC power bus voltage measurement, and the motor speed measurement, from the information defining inverter currents.

22. The apparatus of claim 21, wherein the modifying means modifies the inverter current command based at least in part on the inverter current command to be modified and the second inverter current command.

23. The apparatus of claim 17, wherein the modifying means comprises means for adjusting a first component of the inverter current command according to $$\Delta I_d = \frac{1}{1+k} \Delta I_s$$

and a second component of the inverter current command according to $$\Delta I_q = \frac{k}{1+k} \Delta I_s,$$

wherein $\Delta I_s$ is a phase current delta, $\Delta I_d$ is a change in a first stator current, $\Delta I_q$ is a change in a second stator current, and k is the slope.

24. The apparatus of claim 17, wherein the modifying means comprises means for adjusting a first component of the inverter current command according to $$\Delta I_d = \frac{k}{\sin\beta + k\cos\beta} \Delta I_s$$

and a second component of the inverter current command according to $$\Delta I_q = \frac{k}{\sin\beta + k\cos\beta} \Delta I_s,$$

wherein $\Delta I_s$ is a phase current delta, $\Delta I_d$ is a change in a first stator current, $\Delta I_q$ is a change in a second stator current, k is the slope, and $\beta$ is an angle based on the inverter current command.

* * * * *